United States Patent Office 3,833,745
Patented Sept. 3, 1974

3,833,745
SWEETENING COMPOSITION
John Frank Lontz, 515 Eskridge Drive, Wilmington, Del. 19809, and Richard Titus D'Alonzo, 2511 Lovitt Drive, Memphis, Tenn. 38117
No Drawing. Filed June 1, 1971, Ser. No. 149,037
Int. Cl. A23l 1/26
U.S. Cl. 426—217  3 Claims

ABSTRACT OF THE DISCLOSURE

A non-toxic, low calorie sweetening composition derived from a selective and critical balance of amino acids comprising a non-benzenoid base sweetener, a synergist with a benzenoid substituent and an intensifier with an amido configuration, collectively formulated with a polyhydric carrier.

---

This invention relates to a novel dietary sweetening composition. More particularly, this invention relates to safe non-toxic, satisfying sweeteners for human consumption.

The use of natural and artificial sweetening additives to beverages, numerous food items, mouth washes and gargles, tooth pastes, dental products, and numerous other toilet and food products of all descriptions, is a universal, wide-spread, and esthetically essential supplementation in the human intake of nutritive as well as non-nutritive items. Despite the well-established dicta that sweetening per se is not necessary for sound nutrition, the fact remains that the casual intake of beverages, desserts, confectionery items, refreshments and the like, is a most singular disposition in diets and social habits. The dependence upon the sweet taste will long pervade as a supposedly essential item in accommodation of human dietary habits. Natural sugars such as the varied carbohydrate structures have proved this essentially for a long time unrestrictedly until it was recognized that diabetics would develop toxic symptoms due to their inability to metabolize sugars and so-called normal individuals, from excessive caloric intake, would develop obesity and overnutrition. Before long, artificial sweeteners of varied synthetic, organic structural configurations, notably saccharin, dulcin and the cyclamates have been adopted as substitutes for the natural sugars to impart the sweet taste, while at the same time diminishing the caloric intake usually not only because of the diabetic condition but also because of tendency toward overweight or obesity. However, as it is well-known, the use of these artificial sweeteners is diminishing from the scene for any one or more reasons, especially in view of the pre-emptive indications of inducing cancer and possibly other dangers to human well-being or longevity as well as subtle after-effects on taste and palatability.

In the case of saccharin, its continued or prolonged intermittent usage induces a characteristic bitter aftertaste. Often in a matter of weeks, the user seeks other substitutes to satisfy the desire for sweet taste. In the case of the cyclamates, there is the concern over the likelihood of inducing, directly or indirectly, cancer. It should be noted that these two instances represent structures that are not replicated in any natural organic system, in the biochemical sense, but rather they are foreign to the general organic structures that are part of metabolite building blocks or intermediates in the complex array of physiological biochemistry. In one manner of reference they are viewed as potent and undesirable drugs, or as advantitious incursions into the normal intake of organic structures. It is now recognized that by virtue of their non-similarity to the host of metabolic chemical structures either essential or incidental to human biochemistry, these two instances of artificial sweeteners will remain suspect for continued human consumption, especially at a yearly intake of as much as 50 to 100 grams by an average individual.

A need therefore exists for sweetening agents and supplements inasmuch as the human propensity for sweetness cannot be ended precipitously despite the warnings of dangers to health. Such a need will have to be found in some selected organic structures more nearly identical, or related to that of the metabolic entities, that is to say, such structures as are actually existent in physiological biochemistry.

It is therefore the object of this invention to provide a novel sweetening composition that will satisfy the desire for adequate sweetness. It is a further object to provide a unique sweetening composition that imposes negligible or tolerable contravening sweetness when used in beverages for ingestion or oral cleansing preparations such as mouth washes, gargles and tooth pastes. It is a further object to provide a specific combination of chemical components generally regarded as safe for human consumption and having structural formulae found in, or akin to that occurring naturally in the complex chemistry of metabolism as individual and separate entities. It is still further the object of this invention to provide a sweetening dietary supplement for strictly esthetic value comprising a combination of natural amino acids indigenous, but not essential to human nutrition with other functioning additives of natural plant sources. These and other objects will become evident with the ensuing descriptive details.

The concept of sweetness, in one sense of the term, is self-evident but in the physiological or sensory respect the quality of sweetness involves varied and complex factors many of which have yet to be understood. Thus, often initial sweetness, especially with artificial sweeteners when overdone or overindulged in, can develop into the taste buds or the host a markedly varying quality of taste or can impart to taste buds or palate an opposite sensation through a gradation of decreased sweetness leading ultimately to a bitter taste. The mechanism of this change, sometimes alluded to in a psychophysical scale or spectrum of taste, is not clearly understood, particularly with the ingestion of benzenoid or aromatic ring derived sweeteners, notably that of saccharin and dulcin. It can be conjectured that the range from sweetness to bitterness is a latent effect especially after some time has elapsed after the ingestion of the benzenoid artificial sweeteners as a delayed secretionary response, quite like many undiscerned counteractive mechanisms that nature is wont to provide. The degree to which such counter-responses, that is, from sweetness to bitterness, are stimulated can be complex and of differing order with different individuals and with different sweetening additives. Thus, cyclohexylamine cyclamate, while devoid of the aromatic ring structure and having a much lower sweetening action than saccharin, appears to impose less of the bitter aftertaste or sensation compared to the benzenoid saccharin or dulcin type. In short, to gain a desirable or favorable taste by the use of an artificial or synthetic sweetness there is imposed the disadvantage of an annoying and unfavorable after-sensation. Thus, the sensation of palatability has far-reaching implications involving, or derived from salivary physiology with its complex secretionary responses on the one hand and the digestive state on the other. Taste is the least informative of the senses when graded on a psychophysical scale or spectrum, albeit it is usually categorized into an empirical quality spectrum ranging from sweet to sour, bitter and salty.

In order to understand some of the secretionary aspects of taste, numerous studies have been conducted in two general directions. The first of these relates to obtaining a quantitative or quantitative-like rating in a conventional panel test of participating, individual tasters who rate sweetness by ranking a concentration range, thereby providing a sort of a psychophysical basis involving only the initial sensation to the taste buds. The other, more basic type of studies relate to the biochemical changes in the composition and activity of human saliva in the regeneration of enzymic activity and transient changes in the salivary composition. Both approaches obviously have to be applied along with the conventional assessment of the changes in the biochemical constituents of blood and other circulatory transport systems, all related to the total surveillance of the merits of a candidate sweetening composition or structure. However, what has been particularly lacking in the psychophysical or sensory quantification of a sweetener is the rating of the aftertaste, a feature of this invention that in the panel tests described in the ensuing discussion and examples has been found to acquire equal stance or importance with sweetness scale. Moreover, the aftertaste which ultimately dictates the individual's preference for a sweetener involves not only the intensity of the initial sweetness but also its persistence. These two related yet distinctly different qualities have been utilized as the inseparable bases for uncovering or finding and selecting the preferred sweetening ingredients and the optimal formulation of this invention comprising the following four components, namely, (1) a base of the simplest amino acid glycine, (2) a benzenoid substituted amino acid tryptophan as synergist, (3) an amido substituted amino acid asparagine serving as intensifier, and (4) a polyhydric alcohol sorbitol serving as a carrier as further described in the ensuing discussion and panel tests.

Firstly, the base sweetener in the formulation of this invention is a member of the amino acid metabolites which in themselves are endowed with varying degrees of sweetness and divergent aftereffects on the taste buds. A specific combination of these amino acids has been discovered to have surprisingly synergistic effect on sweetness with regard to initial intensity and persistence. Thus, the simplest amino acid glycine, on a sweetness scale of 100 for sucrose, has a relatively rating of 65 while one of its analog, DL-alanine, has a sweetness rating of 107. The corresponding sweetness rating for cyclamate and saccharin are 3,300 and 30,600, respectively, just to illustrate the markedly lower order of sweetness of the amino acids. Initial subjective taste screening tests by a panel on an extensive series of D- and L-forms of amino acids also revealed a variety of sweetness quality, intensity, and aftertaste among which, and uniquely, D-tryptophan proved most amenable for combinative formulations and most synergistic in providing the panel with the most favored or acceptable sweetening taste.

The D-tryptophan is the optically active obverse of the essential L-form and was found to be outstanding in both the initial sweetening effect and a substantially neutral aftertaste in sweetening formulations with glycine that were devoid of any bitterness, or dulling of the taste buds or otherwise affecting the sensitivity of the taster for discerning other psychophysical ratings of the taste scale. In particular, the D-tryptophan in combination with the least expensive, elementally simple amino acid, glycine, which is available as a large-scale production item, provides a balance of initial intensity and neutral aftertaste unmatched by any of the combinations screened for acceptable taste. From taste panel ratings, it was established that the combination of D-tryptophan as a synergist with the base glycine provided a bland sweetness rating of the combinations of these two components that far exceeded the expected, arithmetic sum of the proportionated ingredients.

In order to match the initial taste intensity so characteristically associated with saccharin and cyclamates to which most people are accustomed, it was discovered that the required sharp taste could be provided by a small amount of L-asparagine. The addition of this amido-bearing substituted amino acid eluded the panels' ability to discern the difference between formulations of this invention and the cyclamate sweetener. For the purposes of this invention, the amido-bearing L-asparagine is referred to as an intensifier. This important function derives from the evaluation by the tasting panel's noting that with only the first two ingredients there was lack of "bite" or "tang" which could be made up, or imparted with the L-asparagine component.

Finally, to gain the quality of dispersion and uniform dissolution of the composite formulations as dispensed into prepared brew of coffee or tea or other beverage preparations, hot or cold, it was found that the D-tryptophan tended to aggregate into a floating flaky residue by some undiscerned phenomenon. It was discovered that this slightly hydrophobic character could be overcome in any one of several ways. One of these is to disperse the D-tryptophan crystalline form in the presence of a water-avid carrier with fairly high hydrophilic yet powdery characteristics, such as found with polyhydric alcohols, mannitol and sorbitol. Another method is by the selective grinding of the four functional components in a controlled sequence of admixture. A still another method is by converting a portion of the D-tryptophan to the corresponding sodium salt. These features may not be needed however when the sweetening formulation is applied to prepared concentrates including such non-dietary items as mouth washes, oral antiseptics, toothpastes, and the like. The concept of this invention will be more evident with the more detailed descriptions provided in the following Examples.

EXAMPLE 1

A series of formulations based on the above functional features was prepared with the combination of the four components such as are summarized in Table 1 describing the responses of a five-membered panel of tasters who tested the formulations in the form of dry, "sugary" powders. The panel members were young women between the ages of 16 and 19 with a strong preference for beverages rather than milk. Each participant was asked to rate the initial taste for sweetness and an aftertaste fifteen to twenty minutes afterwards, the latter done on separate days to eliminate overlap of the effects of each of the formulations tested.

TABLE 1.—PANEL TEST RATING OF FORMULATIONS

| | | Parts by weight | | |
|---|---|---|---|---|
| | Ingredients | Formula A | Formula B | Formula C |
| Function: | | | | |
| Base | Glycine | 50 | 50 | 50. |
| Synergist | D-tryptophan | 40 | 40 | 40. |
| Intensifier | L-asparagine | 0 | 1 | 2. |
| Carrier | D-sorbitol | 10 | 9 | 8. |
| | | Panel rating (composite) | | |
| Initial sensation | | Sweet but bland. | Sweet | Sweet. |
| Aftertaste | | None* | None* | None.* |

*Compared to saccharin.

Without the presence of the D-tryptophan in a control formulation for the above, the panel concensus accorded a rating of a mild bland sweetness. Furthermore, without the intensifier, L-asparagine, the mixture imparted a transient sweet taste lasting only a few seconds. Table 1 illustrates only one of an extensive series of dry powder testing of the four-component formulations with the preferred range of the base amino acid glycine being from 30 to 50 parts with 60 to 40 parts of D-tryptophan, the remaining 10 parts being apportioned between the intensifier L-asparagine and the hydrophylic carrier D-sorbitol. The preferred compositions were then further assessed for preferred formulations with beverages, dessert mixes, and mouth washes, some of which are described in the ensuing Examples.

EXAMPLE 2

A brew of Ceylon tea of moderate strength was prepared with a series of dilutions using sweetener Formula B described in Example 1 for tasting by a five-membered panel of young college women selected for their preference for artificially sweetened beverages. The tasters were asked by means of blind test to rate the presence or absence of sweetness with results summarized in Table 2.

TABLE 2.—PANEL RATING OF INITIAL TASTE IN HOT (WARM) TEA

|  | Members acknowledging sweetness at dilutions 1:$x$ | | | | |
| --- | --- | --- | --- | --- | --- |
|  | 500 | 1,000 | 2,000 | 4,000 | 8,000 |
| Formula B | 5 | 5 | 3 | 3 | 0 |
| Saccharin (tested separately for control) | 5 | 5 | 5 | 5 | 5 |

While the saccharin clearly induced a sweetness response through the above dilutions greater than that of Formula B, the concensus of the panel was that the latter gave no aftertaste reaction at the lower dilutions which was pronounced with the saccharin.

A similar test of brewed tea using only D-tryptophan at the above dilutions evinced a sweetness response only at the 1:500 dilution level, clearly indicating a synergistic effect with the glycine and possibly with the presence of L-asparagine used as an intensifier. The test requires a pausing period, preferably one day apart in order to avoid lingering sensitivity complicated by incidental ingestions by the panel members of various carbonated beverages.

EXAMPLE 3

A brew of moderate strength black coffee prepared by the boiled water extractive (Drip-o-later) method adjusted to a pH of 7.45 with a slight amount of alkaline phosphate, was made up with the same series of dilutions for the five-membered taste panel. The results are summarized in the ensuing Table 3.

TABLE 3.—PANEL RATING OF INITIAL AND AFTERTASTE WITH HOT COFFEE

|  | Members acknowledging sweetness at dilutions 1:$x$ | | | | |
| --- | --- | --- | --- | --- | --- |
|  | 500 | 1,000 | 2,000 | 4,000 | 8,000 |
| Formula C | 5 | 5 | 5 | 1 | 0 |
| Saccharin (2 days later) | 5 | 5 | 5 | 5 | 5 |
| D-tryptophan (3 days later) | 3 | 0 | 0 | 0 | 0 |

Aftertaste.—In a period of from 15 to 30 minutes after the tasting for the presence of sweetness, the concensus of the panel was unanimous in experiencing no pronounced aftertaste with the Formula C or with the control D-tryptophan dilutions whereas the saccharin evoked various kinds of aftertaste especially at the lower dilutions.

EXAMPLE 4

In this example, D-tryptophan is used as a synergist for another potentially economically attractive low calorie amino acid sweetener, namely DL-alanine, which has about 50 to 100 percent higher single-ingredient sweetness compared to glycine. A series of concentrations was made up for a five-membered tasting panel in a blind test using the dry powder formulations to obtain an unbiased additive rating. The results are shown in the following tabulation.

TABLE 4a.—PANEL RATING FOR INITIAL SWEETNESS

| Function | Ingredient | Parts by weight | | | |
| --- | --- | --- | --- | --- | --- |
|  |  | Formula D | Formula E | Formula F | Formula G |
| Base | Dl-alamine | 80 | 60 | 40 | 40 |
| Synergist | D-tryptophan |  | 20 | 40 | 40 |
| Intensifier | L-asparagine |  |  |  | 2 |
| Carrier | D-sorbitol | 20 | 20 | 20 | 18 |
|  | Composite, additive rating by palen [1] | 5 | 12 | 13 | 20 |

[1] Scale: Increasing sweetness 1-2-3-4 per member for a maximum of 20.

The composite, additive rating represents the sum of the ranks accorded increasing sweetness for each of the above formulations. Thus, as the DL-alanine was replaced with progressive amounts of D-tryptophan synergist, the panel consistently spotted the progressive intensity or degree of sweetness, thus setting the next stage for the quantitative dilution test rating summarized in the following tabulation.

TABLE 4b.—PANEL ACKNOWLEDGEMENT OF SWEETNESS IN PROGRESSIVE DILUTIONS

| Formulation | Dilution in brewed hot tea, 1:$x$ | | | | | |
| --- | --- | --- | --- | --- | --- | --- |
|  | 125 | 250 | 500 | 1,000 | 2,000 | 4,000 |
| (a) Formula D (control) | 5 | 2 | 0 | 0 | 0 | 1 |
| (b) Formula F | 5 | 5 | 5 | 3 | 2 | 0 |
| (c) Formula G | 5 | 5 | 5 | 5 | 4 | 0 |
| (d) Saccharin | (*) | 5 | 5 | 5 | 5 | 5 |

*Too bitter to some members.

As the above tabulation indicates, it is evident that the synergist D-tryptophan continues to display the enhanced sweetness effect. In supplementary comments asked of each member of the panel, the overall concensus indicated little or no aftertaste with the DL-alanine and D-tryphophan formulations in contrast to the marked aftertaste experienced with the saccharin. As in previous testing, the ratings were based on a spread of days to avoid overlapping of aftereffects. An approximation of the synergism induced by D-tryptophan, based on an empirical assignment of 110 for DL-alanine and 150 for D-tryptophan based on a 100 sucrose scale, gives about a five to ten-fold enhancement as indicated by the dilution rating with (b) above.

EXAMPLE 5

An iodine-based mouth wash prepared for alleviating the discomfort of a minor sore throat and for counteracting mouth odors caused by garlic, onions, whiskey, and tobacco is made up with 10 parts of an iodine-complex with polyvinylpyrrolidone and $\frac{1}{10}$ part Formula C, described in Example 1, dissolved in 40 percent aqueous ethanol. A masked, blind test by a five-membered panel has shown an almost unanimous preference for the resulting combination compared to the control iodine-complex without the sweetening formulation with respect to (a) initial sweetness, (b) masking of the iodine taste, and (c) absence of an after-taste, using a gargle with a 1:32 dilution with water.

EXAMPLE 6

A non-proprietary dental powder for brushing teeth using home items made up of one part common table salt, 4 parts baking soda, and $\frac{1}{100}$ parts of Formula C, described in Example 1, is made up for panel preference testing against a reference or control mixture without the latter. A masked, blind test by the five-membered panel unanimously chose the mixture supplemented with Formula C on the basis of (a) more pleasant taste to overcome in the saltiness and the insipid-like quality of the baking soda and (b) a prolonged sensation of satisfying sweetness.

In the above-described examples it has been the intent to use the low calorie-per-gram value of the amino acids as the principal source of sweetening. In this concept, glycine affords the most attractive economic base as it can cost around 0.7 cents per gram compared to around 2.10 cents per gram for DL-alanine even though the latter provides about 50 percent more sweetness. Nevertheless, as indicated in Example 4, the synergistic effect of D-tryptophan is therefore an important economic factor in lowering the calorie level in sweetening formulae within acceptable costs on weight basis.

In the concept of this invention, what is presented is a specific combination of four differently functioning, mutually dependent features based on low calorie amino acids of economic merit. In the latter respect, glycine is the preferred base component of the overall sweetener formulation, but it can be replaced in part or totally by other amino acids or their derived forms including salts, esters and amides of equivalent sweetness rating where the price or cost tolerance is acceptable such as illustrated with DL-alanine. In so far as the diet would dictate or allow, the base sweeteners, in part or totally, could be substituted with natural carbohydrates of which a variety are available and even recommended in limited amounts for dietary or nutritional need or value. The base sweetener as a nonbezenoid structure in the formulation of this invention is utilized in the range of 20 to 80 parts in a 100 part total formulation with the preferred range being between 40 and 60 parts.

The principal feature of the formulation of this invention is the exploitation of the enhancing or synergistic action of D-form, the stereoisomer antipode of the naturally occurring, essential L-tryptophan, as the benzenoid constituent just as saccharin and dulcin provide this moiety in their sweetening effect but by mechanisms that have yet to be elucidated. D-tryptophan not only has a more pronounced sweetening effect than the base, non-benzenoid glycine but also imparts a bland, mollifying action with little or no aftertaste. It is used in this invention in a minor proportion in the range of 10 to 40 parts on the 100 parts total formulation, with a preferred range between 10 and 20 parts. Normally crystallizing in plates or flakes, the crystalline or powdery form is important and it is further preferred to use extremely microcrystalline form. Also, a suitable modification is to use a partially or completely alkalinized form such as would be precipitated or co-precipitated from solutions buffered with alkaline phosphates. Portions of the allocated parts of the D-tryptophan can be replaced with amides and esters endowed with hydrophilic or surface tension lowering characterisics.

For the third component, namely the intensifier, it has been discovered and suitably illustrated in the above Examples that an amido-bearing amino acid, notably L-asparagine, imparts a unique, penetrating taste. The mechanism by which this effect exerts this action on the taste buds is undiscernible as only a minor proportion has been found to be needed. The effective proportion is in the range of 0.5 to 4 parts by weight in a total of 100 parts, with the preferred range being from 1 to 2 parts by weight.

As with many supplements serving as nutrient additives for dietary preparations or refreshments, the formulation requires a carrier or an adjuvant which in this invention is implied to include numerous and varied functions, such as particulate stability against ingredient segregation, to serve as deflocculants for proper dissolution or dispersion, to act as humectants, and to impart other physical features. In the present invention, D-sorbitol has been employed and found particularly effective in fulfilling one or more of these physical requirements. Moreover, its choice was also based on its well-established safety and non-toxicity for human consumption. In the examples described in this invention, D-sorbitol serves particularly as an effective dispersing agent and as a mild humectant by virtue of its hydrophilic character. It also has a moderate sweetening effect and contributes to the caloric level of the formulation which, however, is acceptably small. As a polyhydric alcohol, D-sorbitol has several naturally-occurring analogs such as mannitol and others which can be substituted for the D-sorbitol. Other carriers include fine grade of starch which can impart free-flowing properties serving as a binding agent holding the minuscular particles of the other functional ingredients. The composition range for such carriers may range between 5 and 40 parts by weight based on a total of 100 parts by weight of the formulation, with the preferred range being between 10 and 20 parts.

An important factor in compounding the diverse, functional ingredients is the fineness of the mixture which can also serve to intensify the sweetness quality. Certain crystalline forms of organic acids, amino acids and derivatives tend to reticulate or aggregate usually with the occlusion of air and thus separate as a noticeable float which becomes evident in cold or lukewarm aqueous beverages. In hot beverage preparations or on standing these floats or large flaky crystalline aggregates gradually dissolve and hence are considered acceptable for the formulations. However, with cold or iced preparations, the aggregative or reticular propensity can be obviated by various means. In one case, the combined formulation can be ground simultaneously to pass a minimum screen or sieve analysis usually through a specified, standard 40-mesh screen and higher. Another technique involves a preferred sequence of milling the carrier with the base sweetener followed by a scheduled addition of the synergist and then the intensifier, after which the product is screened to gain the ultimate, uniform particulate distribution. The milling and mixing processes are also useful in imparting several desirable product features, notably excipient or free-flowing quality, non-caking when exposed to humid conditions, and numerous others.

While the Examples and descriptions in this invention have recited specific formulations for the esthetic values of sweetening for the sake of palatability, the needs and values of this invention combine this feature also with prudent control of caloric intake. The lack of bitter aftertaste, the pleasant gustatory sensation, and the sensation of gustatory satisfaction, coupled with the sweetness promoted alimentary relaxation, alleviates the compulsion to consume food between meals, thereby encumbering the person with extra and unneeded calories. Thus, the desirable effects usually tends to promote feeling of mental well-being and nutritional adequacy, as was actually demonstrated in a diet control test. During a test period of one month's duration, three overweight patients who were developing depressive symptoms from their compulsive eating habits volunteered to apply a little of the composition of TG4050–B, described in Table 1, on the tip of their tongues between meals. From periodic inquiries all three reported they developed a pleasant, sustaining sweet taste with no bitter aftertaste. All three reported an alleviation of varying degrees of the compulsion to eat between meals, or as commonly referred to as nibbling, as well as a feeling less compulsive to eat excessively at meal time. After the one month test period, the average weight loss of the three patients was as follows:

First week: three pounds,
Second week: two pounds,
Third week: two pounds, and
Fourth week: one and one half pounds, which totalled an average of eight and one-half pounds with a fairly simple use of the formulation. Other applications of the formulations of this invention include other ingestive preparations either with food or beverages or with such hygienic items as mouth washes, gargles, toothpastes and so on. In such application further modifications of the amino acid components can be utilized and exploited such as adjusting with a range of acidity or alkalinity with the use of salts of sodium, potassium, calcium and magnesium and with conventional buffering systems.

While this invention has been described with respect to a number of specific embodiments, it is obvious that other equivalents and extensions can be adopted and utilized without departing from the intent of the invention as further indicated in the ensuring claims.

What is claimed:

1. A sweetening composition consisting of 30 to 50 parts by weight of an aliphatic amino acid taken from the class consisting of glycine and DL-alanine, 60 to 40 parts by weight of D-tryptophan, 1 to 2 parts by weight of L-asparagine, and 8 to 9 parts by weight of D-sorbitol.

2. A sweetening composition consisting of 30 to 50 parts by weight of glycine, 60 to 40 parts by weight of D-tryptophan, 1 to 2 parts by weight of L-asparagine, and 8 to 9 parts by weight of D-sorbitol.

3. A sweetening composition consisting of 30 to 50 parts by weight of DL-alanine, 60 to 40 parts by weight of D-tryptophan, 1 to 2 parts by weight of L-asparagine, and 8 to 9 parts by weight of D-sorbitol.

References Cited

UNITED STATES PATENTS 3,642,491   2/1972   Schlatter _____ 99—141 A

FOREIGN PATENTS 602,572   8/1960   Canada _____ 99—141 A

OTHER REFERENCES

Greenstein et al., "Chemistry of the Amino Acids," Vol. 1, p. 151.

RAYMOND N. JONES, Primary Examiner

U.S. Cl. X.R.

426—190